United States Patent [19]

Haland et al.

[11] Patent Number: 4,756,553
[45] Date of Patent: Jul. 12, 1988

[54] SAFETY BELT SYSTEM

[75] Inventors: Lars Y. Haland, Falsterbo; Bengt O. J. S. Morner, Hovas, both of Sweden

[73] Assignee: Autoliv Development AB, Vargarda, Sweden

[21] Appl. No.: 14,500

[22] Filed: Feb. 13, 1987

[30] Foreign Application Priority Data

Feb. 20, 1986 [SE] Sweden .............................. 8600785

[51] Int. Cl.⁴ ............................................. B60R 21/10
[52] U.S. Cl. ..................................... 280/804; 280/808
[58] Field of Search ............... 280/801, 802, 804, 807, 280/808

[56] References Cited

U.S. PATENT DOCUMENTS

| | | | |
|---|---|---|---|
| 3,830,518 | 8/1974 | Silber | 280/804 |
| 4,296,944 | 10/1981 | Matsuoka et al. | 280/804 |
| 4,345,781 | 8/1982 | Suzuki et al. | 280/802 |
| 4,659,108 | 4/1987 | Sack et al. | 280/807 |

Primary Examiner—Kenneth R. Rice
Attorney, Agent, or Firm—Spencer & Frank

[57] ABSTRACT

In a passive vehicle safety belt in which one end of the belt is guided along a track by means of fastening means, slidable along the track and connected to one end of the safety belt, a retractor mechanism is provided which can be selectively locked in order to prevent safety belt being drawn into a retractor mechanism while the fastening means is in motion. Thus a loop of safety belt can be generated which does not strike the face of the person wearing the safety belt.

10 Claims, 3 Drawing Sheets

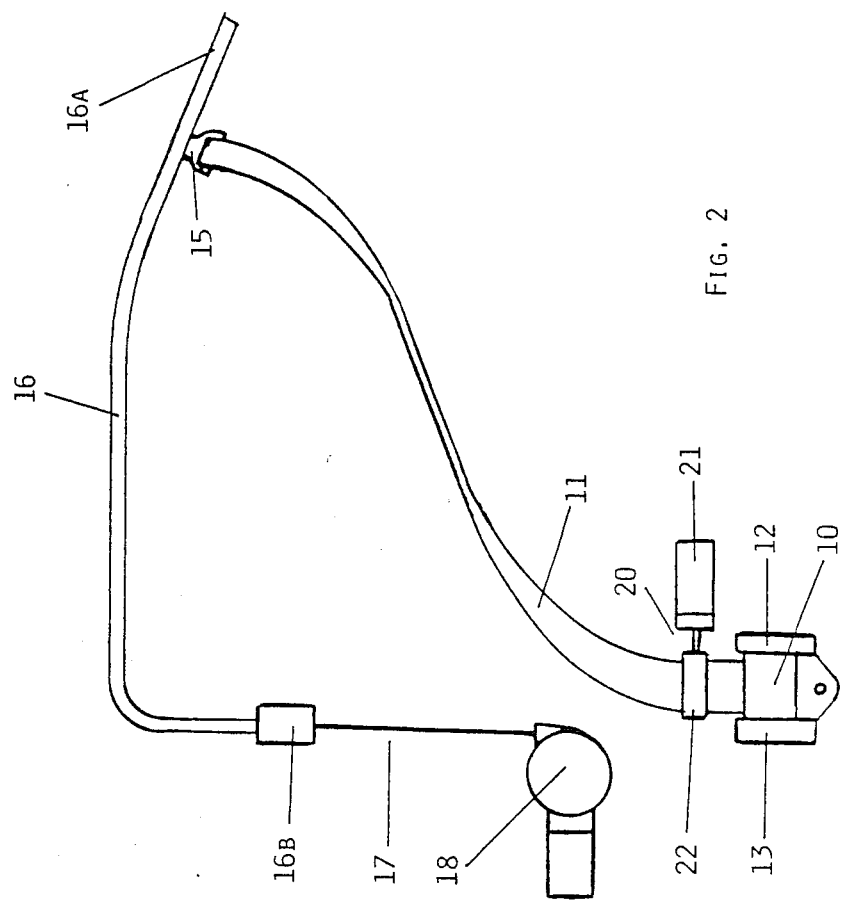

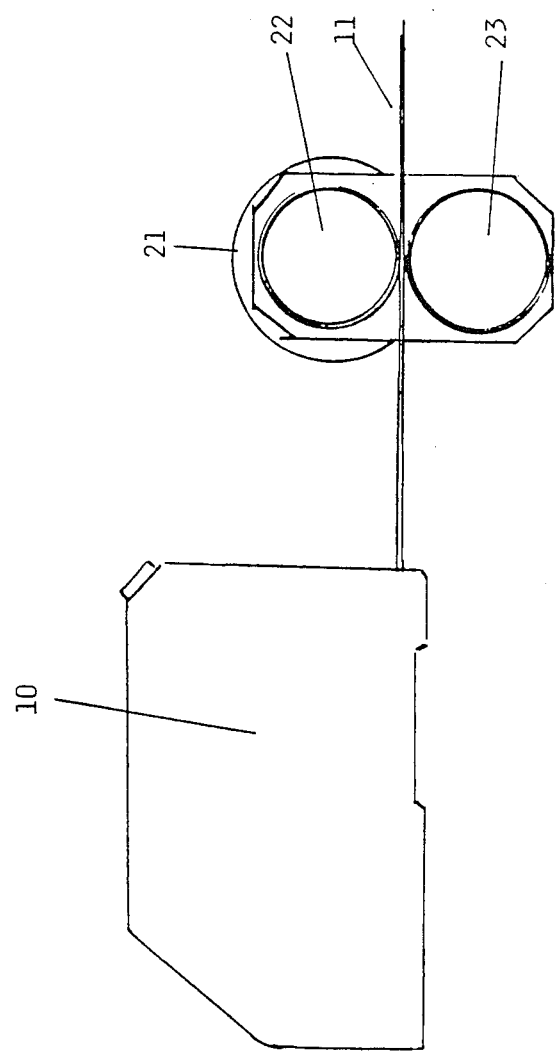

SAFETY BELT SYSTEM

BACKGROUND TO THE INVENTION

The present invention relates to a safety belt system and more particularly relates to a "passive" safety belt system in which means are provided for automatically placing the safety belt on a person to be restrained by the safety belt, and for automatically removing the safety belt from that person, at appropriate times.

Many passive vehicle safety belt systems have been proposed before. One typical system of this type is disclosed in U.S. Pat. No. 3,830,518. The passive vehicle safety belt system disclosed in this Specification comprises means to store a safety belt, in the form of a retractor reel, which is positioned on the inner side of the seat to be occupied by a person to be restrained by the safety belt, that is to say the retractor reel is located on the side of the seat remote from the door of the vehicle. A fastening means is attached to the end of the safety belt that can be extracted from retractor reel, and the fastening means is engaged with a guide rail which is attached to the vehicle body on the outer side of the chair, that is to say on the side of the chair remote from the means to store the safety belt. The fastening means can be moved along the rail, and to assist this movement along the rail there is a power transmitting means connected to the fastening means for moving the fastening means along the rail, the power transmitting means incorporating a reversible motor. Thus the fastening means may be moved along the guide rail between a forward end position, in which the safety belt is removed from the person to be restrained by the safety belt, and a rear end position in which the safety belt is brought into a position in which it can restrain the person. A passive vehicle safety belt system seeks to ensure that the safety belt is automatically applied to a person, such as the driver of the vehicle before the vehicle is driven off.

It is difficult, in many particular types of motor car, to insert a passive safety belt system that is found to be acceptable to the driver and/or passengers in the motor vehicle. One reason for this is that in the design of passive safety belt system described above, a portion of the safety belt will pass very close to the head of the person to be restrained by the safety belt as the fastening means move along the guide rail. The problem is particularly noticeable in cars where the top portions of the side walls inclined inwardly. Since the guide rail must be located towards the top of the side wall, the guide rail is then at a position which is relatively close to the centre of the car, and consequently a portion of the safety belt may then pass very close to the face of the person to be restrained by the safety belt as the fastening means moves along the guide rail. Indeed, under certain conditions, this portion of the safety belt may strike the face of the person to be restrained by the safety belt which is very irritating.

OBJECT OF THE INVENTION

The present invention therefore seeks to provide a passive vehicle safety belt system in which the above described disadvantages of the prior art are obviated or eliminated. A further object of the invention is to provide a passive safety belt system in which movement of the fastening means between the end positions of the guide rail is facilitated.

BRIEF SUMMARY OF THE INVENTION

According to this invention there is provided a passive vehicle safety belt system to provide the automatic application of a safety belt to a person to be restrained thereby and the subsequent removal of the safety belt from that person, said safety belt system comprising retractor means adapted to retain a length of safety belt, said retractor means being positioned at one side of a seat in said vehicle, a fastening means attached to the end of the belt extractable from said retractor means, a guide rail which is attached to the vehicle body on the other side of said seat, said fastening means engaging the guide rail and being movable therealong, power transmitting means connected to the fastening means for moving the fastening means along the guide rail, and reversible motor means to drive the power transmitting means for moving the fastening means along the guide rail between two end positions, said retractor means being associated with controllable means adapted to prevent retraction of the safety belt into the retractor means during at least part of the movement of said fastening means between the said two end positions, the arrangement being such that, in use, the portion of the safety belt lying between the fastening means and the retractor means, during at least part of the movement of the fastening means between the two end positions, forms a loosely hanging loop, said means also being adapted to permit retraction of the band into the reactor means when the fastening means is in or adjacent its new end position.

Preferably said means is adapted to lock the safety belt during at least part of the movement of the fastening means, so that the safety belt cannot be retracted into the retractor means or paid out from the retractor means.

Conveniently, the said means is adapted to pay out band from the retractor means during at least a first portion of the fastening means between the two end positions.

Advantageously, the control means is adapted to lock the safety belt during an intermediate part of the movement of the fastening means between the two end positions.

Preferably the control means is adapted to retract safety belt into the retractor means during the end stages of the movement of the fastening means between said two end positions.

Conveniently, said control means comprises an electric motor adapted to drive the safety belt on actuation thereof.

Preferably, the electric motor is adapted to drive at least one roller, which is adapted to cooperate with another roller to form a nip through which the safety belt can pass so that actuation of the motor causes the belt to be driven.

Conveniently, said electric motor is adapted to be short-circuited to brake the safety belt.

Advantageously, the electric motor is reversible, so that the electric motor can provide powered retraction of the belt.

Preferably, the fastening means is provided with a spring biassed arm, said arm being provided with means adapted to engage the belt adapted to keep a portion of the belt adjacent the fastening means depending substantially vertically downwardly.

It is to be understood that, in preferred embodiments of the invention, a control means prevents retraction of the safety belt during at least part of the movement of the fastening means between the two end positions of the guide rail. The safety belt extending between the retractor means and the fastening means thus forms a loosely hanging loop during at least the said part of the movement of the fastening means. It is thus possible to design a system in which the safety belt does not come too close to the face of the person to be restrained by the safety belt. Also, the existence of this loosely hanging loop also facilitates movement of the fastening means along the guide rail, since there will be less friction between the fastening means and the guide rail than there would be if the safety belt were tight between the fastening means and the retractor mechanism. It is to be understood that the fastening means will not be subjected to any tilting force from the safety belt, and thus can move relatively freely along the guide rail.

If the end positions of the guide rail are appropriately positioned, a loosely hanging loop of an adequate size can be generated by arranging for the control means to lock the safety belt, to prevent safety belt being retracted, during at least a part of the movement of the fastening means. However, in some models of motor car having side walls with heavily inclined upper portions, it is not sufficient merely to lock the retractor means, because this will not provide a hanging loop of sufficient size. Thus, in certain embodiments of the invention, the control means which prevent retraction of the safety belt are adapted to actually supply belt from the retractor means during a part of the movement of the fastening means between the two end positions on the guide rail. This supply of safety belt may be combined with a locking of the belt during another part of the movement of the fastening means, and possibly with a retraction part of the belt during the last portion of the movement of the fastening means towards one or both of the end positions on said guide rail. Alternatively, the control means may effect a retraction of part of the safety belt when the fastening means has reached its end position on the guide rail. By such steps the supply and retraction of the safety belt can be controlled so that an optimum loop is always provided.

In one embodiment of the invention the fastening means is provided with a spring biassed arm which is biassed to keep a part of the safety belt in the region of the fastening means hanging vertically downwardly, and this expedient can serve to minimise any inconvenience experienced by the person to be restrained by the safety belt.

BRIEF INTRODUCTION TO THE DRAWINGS

FIG. 2 is a corresponding schematic view illustrating a second embodiment of the invention, comprising a control means adapted to supply safety belt from the retractor mechanism; and FIG. 3 illustrates part of the control means shown in FIG. 2, but to a larger scale.

DESCRIPTION OF PREFERRED EMBODIMENT

Figure 1:
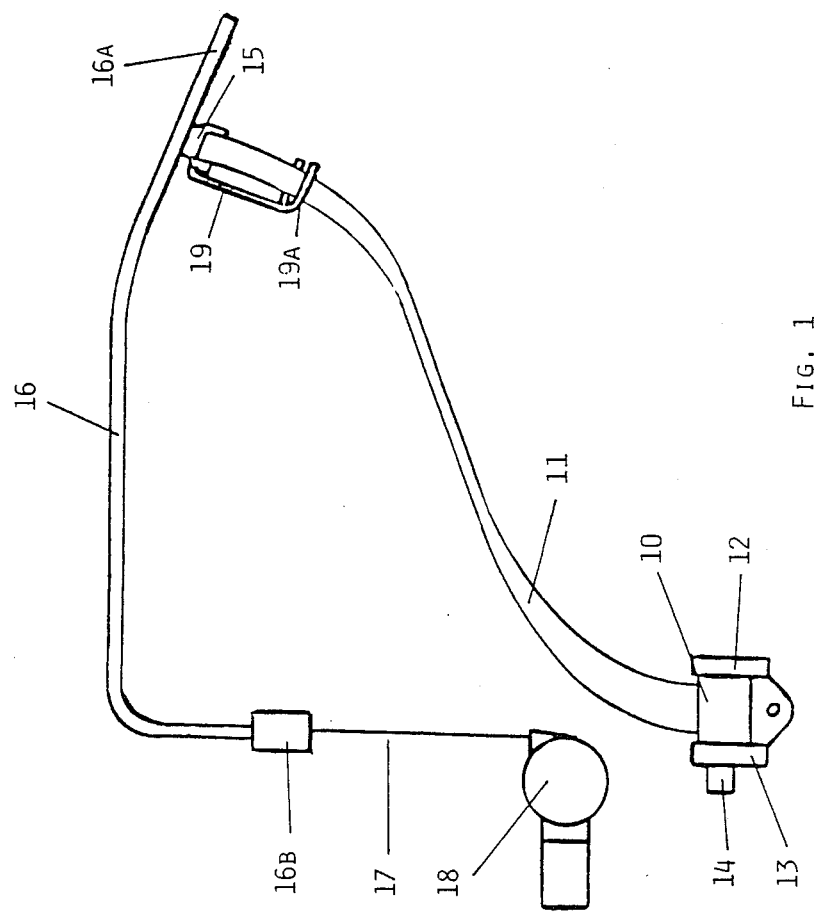
FIG. 1 is a schematic illustration of a passive vehicle safety belt system in accordance with the invention, comprising a control means adapted to lock the retractor mechanism.

FIG. 1 illustrates a passive vehicle safety belt system which comprises a retractor and belt storage mechanism incorporating a conventional retractor reel 10. The retractor reel 10 is positioned on the inner side of the seat to be occupied by a drive of the vehicle (not shown), that is to say on the side of the seat remote from the door. A safety belt 11 can be extracted from the retractor reel 10 in a conventional way. The retractor reel is provided, on one side 12, with a spring mechanism for automatically retracting safety belt onto the reel. On the other side 13, the retractor reel may be provided with a safety belt and/or vehicle-sensitive locking device of a conventional type to lock the retractor reel to prevent any further belt being withdrawn from the reel. It will thus be appreciated that the retractor reel may be of a conventional design. However, in accordance with the invention, the retractor reel is provided with an additional locking means 14, which may be an electrical locking means or a mechanical locking means, capable of locking the retractor reel so that no more safety belt can be extracted from the reel. This will be explained further below.

The end of the safety belt 11 which is extracted from the retractor mechanism 10 is provided with a fastening means 15, in the form of a "carriage", movable along and retained by a guide rail 16. The guide rail 16 is attached to the body of the motor vehicle in a region which is on the opposite side of the driver's seat to the retractor mechanism 10. Thus the guide rail is adjacent the door of the vehicle adjacent the driver's seat.

A power transmission means runs in the guide rail, this transmission means being in the shape of a tape 17, which is attached to the fastening means, and which is adapted to be moved along the guide rail by means of a reversible motor 18. Such a transmission is conventional. The motor can be controlled, for example, in response to signals generated when the door of the vehicle is opened or closed, or by signals generated when the ignition system of the vehicle is switched on and off. Various other devices may be utilised to supply control pulses, such as weight sensitive means present in the seat to be occupied by the driver.

The fastening means 15 is movable by means of the power transmission means 17 between a forward end position 16A, in which the safety belt is withdrawn from the person to be restrained thereby, and a rear end position 16B in which the safety belt is engaged with the person to be restrained thereby. The forward end position 16A is positioned on the A-pillar of the vehicle, and the rear end position 16B, is positioned on the B-pillar of the vehicle, which is located adjacent or behind the driver's seat.

The fastening means 15 is provided with a depending arm 19. The arm 19 may be resilient or may be a rigid arm, pivotally connected to the fastening means 15, and resiliently biassed to occupy a depending position. The lower end of the arm 19A is fork-shaped, and part of the safety belt 11 extends between the two tines of the fork-shaped end. The lower end of the arm is resiliently biassed to occupy a position substantially below the fastening means 15, and thus the purpose of the resilient arm 19 is to keep the relevant part of the safety belt extending downwardly from the fastening means, when the safety belt is being applied to or withdrawn from the person to be restrained by the safety belt. This may minimise any risk of the safety belt engaging the face of that person.

In operation of the described device, when the driver enters the car, the fastening means is in its forward end position 16A. Thus, the safety belt is not in a position where it will hinder the person from getting into the motor vehicle. When the driver is seated in the motor vehicle and, for example, closes the door (or switches on the ignition) the reversible motor 18 is actuated, and pulls the fastening means to its rear end position 16B by means of the tape 17. When the fastening means leaves the forward end position, the locking means 14 is actuated, so that the retractor mechanism 10 is locked, and thus, as the fastening means 15 moves, the safety belt 11 cannot be retracted into the retractor mechanism 10. Thus the portion of the safety belt lying between the retractor mechanism 10 and the fastening means 15 begins to form a loosely hanging loop, due to the geometry of the arrangement. This prevents the safety belt from coming close to the head of the person to be restrained thereby, as the safety belt is applied to that person. When the fastening means, and the safety belt have passed the driver's head, the locking means is released, and then if there is any slack in the safety belt, a part of the safety belt is retracted into the retractor mechanism, so that the safety belt is then applied, with an appropriate tension, to the person to be restrained thereby. Of course, when the locking means 14 releases possible further safety belt may be withdrawn from the retractor means, if this is necessary. Alternatively, of course, the locking means may be adapted so that, when actuated, they prevent any belt being withdrawn into the retractor means, but permit a further length of belt to be extracted therefrom, if necessary.

It is to be appreciated that the above-described embodiment of the invention would work in a satisfactory manner when the front and rear end positions on the guide rail may be so located that as the fastening means moves between the front end position and the rear end position a loosely hanging loop of strap is formed. However, it is not possible to arrange the guide rail in such a position in all models of motor vehicle.

FIG. 2 illustrates a modified embodiment of the invention. Most of the features of this modified embodiment of the invention are the same as the corresponding features of the embodiment described above. These features thus have identical reference numerals to those utilised above, and these features will not be specifically described again.

In the embodiment shown in FIG. 2 the control means for controlling the supply of safety belt from the retractor means does not comprise a locking means 14, but instead comprises a safety belt driving means 20. This driving means consists of a reversible electric motor 21, which serves to drive a drive roller 22. The driver roller 22 is in contact with the safety belt, and is adapted to cooperate with a further roller 23 which is positioned on the opposite side of safety belt to the drive roller 22. Thus the safety belt passes through a nip between the two rollers and it will thus be understood that actuation of the reversible electrical motor can cause the belt driving means 20 either to draw safety belt in or pay safety belt out.

It will be appreciated, in utilising the embodiment illustrated in FIG. 2, the safety belt can be paid out from the retractor device during at least a portion of the movement of the fastening means between the end position 16A and 16B on the guide rail, and this paying out of the safety belt can be provided irrespective of the particular end position from which the fastening means starts its movement. Consequently, a hanging loop of much larger size can be obtained utilising the embodiment as shown in FIG. 2. Thus any inconvenience to a person to be restrained by the safety belt may be reduced to an absolute minimum. The paying out of the safety belt also has the advantage that the designer of the system may locate the end positions of the fastening means at any convenient position, without having to take into account the size of loop that will be generated as the fastening means moves along the guide rail. Also, because the hanging loop can be made much larger than in the embodiment shown in FIG. 1, it will be possible to provide an adequate embodiment of the invention without the spring biassed arm.

The electric motor which drives the roller 22 is preferably designed so that it can be utilised to lock or brake the safety belt. This can be achieved by designing the electric motor in such a way that it can be shortcircuited. The motor will, when power is not supplied to it, operate as a generator as the drive roller 22 is rotated, but if the motor is shortcircuited, the motor will provide a braking effect. Thus accurate control of the safety belt can be achieved. Thus, initially a sufficient length of the safety belt may rapidly be paid out from the retractor mechanism when the safety belt is applied to or removed from the person to be restrained thereby, and then the driving roller can be braked, thus preventing any more safety belt being paid out and preventing safety belt being retracted. Subsequently the safety belt can be rapidly retracted utilising the roller 22.

It will thus be understood that the retraction of the safety belt can start, under appropriate control signals, before the fastening means reaches its end position, or the retraction can be carried out after the fastening means has reached its end position.

Because the paying out and the retraction of the belt can be performed by means of the electric motor and the driving roller, it is not necessarily to utilise a retractor reel, but instead the drive roller may merely drive the safety belt into an appropriate safety belt storage device. Alternatively, of course, the retraction of the safety belt can still be provided by means of a conventional retractor reel. In this case, the electric motor has to be appropriately controlled, so that the motor does not hinder the retraction of the safety belt into the retractor reel.

Whilst two embodiments of the invention have been illustrated and described, it is to be understood that many different embodiments of the invention may be devised. For example, the locking of the safety belt can be provided either by locking the shaft of the retractor reel, or by actuating a separate clamping means which engages the safety belt. Such clamping means may be mechanical or may be electrical. The supply and retraction of safety belt, and the locking of the safety belt, can also be provided in many different ways. Thus the described motor can drive a driving roller at the exit of the safety belt retractor reel, and may be combined with a locking means for locking the reel. Alternatively, the motor may itself drive the shaft of the retractor reel. In such a case, however, measures must be taken to prevent the so-called "film-reel" effect in the retractor reel in which, when the shaft of the reel is rotated, the various turns of safety belt on the reel merely become loosened, and no safety belt is actually paid out from the reel.

Whilst, in the illustrated embodiments of the invention, a conventional retractor reel has been illustrated, other types of belt storing device can be used, such as a device in which the belt is stored in loose loops.

Whilst the invention has been described with reference to preferred embodiments, it is to be understood that many modifications or improvements may effected

What is claimed is:

1. A passive vehicle safety belt system to provide the automatic application of a safety belt to a person to be restrained thereby and the subsequent removal of the safety belt from that person, said safety belt system comprising retractor means adapted to retain a length of safety belt, said retractor means being positioned at one side of a seat in said vehicle, a fastening means attached to the end of the belt extractable from said retractor means, a guide rail which is attached to the vehicle body on the other side of said seat, said fastening means engaging the guide rail and being movable therealong, power transmitting means connected to the fastening means for moving the fastening means along the guide rail, reversible motor means to drive the power transmitting means for moving the fastening means along the guide rail between two end positions, and controllable means associated with said retractor means for preventing retraction of the safety belt into the retractor means during at least part of the movement of said fastening means between the said two end positions, said controllable means being operative such that, in use, the portion of the safety belt lying between the fastening means and the retractor means, during at least part of the movement of the fastening means between the two end positions, forms a loosely hanging loop, said controllable means also being adapted to permit retraction of the belt into the retractor means when the fastening means is in or adjacent its new end position.

2. A safety belt system according to claim 1, wherein said controllable means is adapted to lock the safety belt during at least part of the movement of the fastening means, so that the safety belt cannot be retracted into the retractor means or paid out from the retractor means.

3. A safety belt system according to claim 1, wherein the said controllable means is adapted to pay out band from the retractor means during at least a first portion of the movement of the fastening means between the two ends positions.

4. A safety belt system according to claim 3, wherein said controllable means is adapted to lock the safety belt during an intermediate part of the movement of the fastening means between the two end positions.

5. A safety belt system according to claim 3, wherein said controllable means is adapted to retract safety belt into the retractor means during the end stages of the movement of the fastening means between said two end positions.

6. A safety belt system according to claim 3, wherein said controllable means comprises an electric motor adapted to drive the safety belt in actuation thereof.

7. A safety belt system according to claim 6 wherein the electric motor is adapted to drive at least one roller, which is adapted to cooperate with another roller to form a nip through which the safety belt can pass so that actuation of the motor causes the belt to be driven.

8. A safety belt system according to claim 6, wherein said electric motor is adapted to be short-circuited to brake the safety belt.

9. A safety belt system according to claim 6, wherein the electric motor is reversible, so that the electric motor can provide powered retraction of the belt.

10. A safety belt system according to claim 1, wherein the fastening means is provided with a spring biassed arm, said arm being provided with means adapted to engage the belt to keep a portion of the belt adjacent the fastening means depending substantially vertically downwardly.

* * * * *